United States Patent [19]

Tawa

[11] Patent Number: 5,539,528
[45] Date of Patent: Jul. 23, 1996

[54] INTERMITTENT RECORDING METHOD AND INTERMITTENT RECORDING APPARATUS

[75] Inventor: Kazutomo Tawa, Nagaokakyo, Japan

[73] Assignee: Mitsubishi Denki Kabushiki Kaisha, Tokyo, Japan

[21] Appl. No.: 412,849

[22] Filed: Mar. 29, 1995

Related U.S. Application Data

[63] Continuation of Ser. No. 180,069, Jan. 11, 1994, abandoned.

[30] Foreign Application Priority Data

Feb. 9, 1993 [JP] Japan .................................. 5-020935

[51] Int. Cl.$^6$ ............................... H04N 5/76; H04N 7/18
[52] U.S. Cl. .......................................... 358/335; 348/143
[58] Field of Search .................................. 358/335, 310, 358/342, 312, 313; 360/32, 35.1, 10.3, 11.1, 10.1; 348/143; H04N 5/76, 5/78, 5/765, 5/782

[56] References Cited

U.S. PATENT DOCUMENTS 4,280,159  7/1981  Nakayama ............................. 360/137
4,589,045  5/1986  Koyama .................................. 360/137
4,796,104  1/1989  Ito et al. ................................. 360/10.3

FOREIGN PATENT DOCUMENTS 2-187980  7/1990  Japan .

Primary Examiner—Tommy P. Chin
Assistant Examiner—Robert Chevalier

[57] ABSTRACT

An intermittent recording method for recording video signals intermittently by frame skipping, wherein optimum intermittent recording interval and total recording time for the video signals to be recorded are calculated from an intermittent recording interval and recording capacity of a recording medium which are input, and the video signals are recorded intermittently on the recording medium according to the calculated optimum intermittent recording interval. Or, alternatively, optimum intermittent recording interval for the video signals to be recorded is calculated from the recording capacity of the recording medium and the total recording time which are input, and the video signals are recorded intermittently on the recording medium according to the calculated optimum intermittent recording interval. The input data and the calculated data are displayed.

4 Claims, 6 Drawing Sheets

INTERMITTENT RECORDING METHOD AND INTERMITTENT RECORDING APPARATUS

This application is a continuation of application Ser. No. 08/180,069 filed on Jan. 11, 1994, now abandoned.

BACKGROUND OF THE INVENTION

1. Field of the invention

The present invention relates to an intermittent recording method and an intermittent recording apparatus for the intermittent recording of video signals by means of frame skipping.

2. Description of Related Art

In an intermittent recording apparatus, when recording video signals intermittently by means of time-lapse VTR for the purpose of surveillance, for example, video signals are recorded by dropping a picture at intervals, dropping one picture for every six pictures for example, in the unit of frame or field. This interval of dropping a picture is the intermittent recording interval. Generally in the prior art, appropriate recording time is set according to the recording capacity of the recording medium when recording, and the video signals are recorded intermittently at the intermittent recording intervals corresponding to the recording time.

FIG. 1 is a block circuit diagram illustrative of the constitution of a conventional intermittent, recording apparatus. In FIG. 1, numeral 1 denotes a recording time setting unit which selects a recording time mode from among a plurality of predetermined recording time modes, by means of a switch or the like. The recording time mode setting unit 1 sends the selected recording time mode to a system control unit. 2. The system control unit 2 controls the recording apparatus at the intermittent recording intervals preset beforehand according to the recording time mode which has been input. To sum up, the system control unit. 2 controls, an intermittent recording control unit 4 which controls the operations of a mechanism, a motor, or the like involved in the intermit, tent recording in accordance to a control signal from the system control unit, 2, and a video signal processing unit. 5 which processes the video signals to be recorded intermittently. Numeral 3 denotes a display unit having a liquid crystal display, for example, to display the recording time mode which is selected.

The operation will now be described below. FIG. 2 is a flow chart, illustrative of the procedure of determining the intermittent recording interval in the recording time mode setting unit. 1. In this example, such intermittent recording intervals are determined in advance that correspond to the recording modes from 2-hour mode to 480-hour mode. When a recording time mode which has been selected is input, the intermittent recording interval corresponding to the recording time mode is selected and output from the recording time mode setting unit 1 to the system control unit 2. In order to control the intermittent recording operation according to the intermittent recording interval which has been input, the system control unit 2 outputs control signal to the intermittent recording control unit 4 and the video signal processing unit 5, thereby intermittent recording is carried out. Information on the selected recording time mode is output to the display unit 3 to display the recording time mode which is selected.

The conventional intermittent recording apparatus the following problems because it is constituted as described above. Only the recording time modes prepared in the recording time mode setting unit 1 in advance can be selected. Because the intermittent recording interval is not displayed, the selected intermittent recording interval cannot be known unless the selected recording time mode is checked with the instruction manual. Moreover, when various types of recording media having different recording capacities are used, the user must select the recording time mode by calculating the recording time from the recording capacity of the recording medium which provides a reference of the recording time mode, thus causing an inconvenience of operation.

SUMMARY OF THE INVENTION

An object of the invention is to provide an intermittent recording method and an intermittent recording apparatus capable of obtaining an appropriate intermittent recording interval according to an arbitrary intermittent recording interval given from the outside and the recording capacity of the recording medium to be used.

Another object of the invention is to provide an intermittent recording method and an intermittent recording apparatus capable of obtaining an appropriate intermittent recording interval according to an arbitrary total recording time given from the outside and the recording capacity of the recording medium to be used.

Further another object, of the invention is to provide an intermittent recording method and an intermittent recording apparatus capable of displaying the intermittent recording interval which has been set.

Further another object of the invention is to provide an intermittent recording method and an intermittent recording apparatus which allow easy operation of intermittent recording for the convenience of the user.

According to the invention, optimum intermittent recording interval and total recording time for the video signals to be recorded are calculated front the intermittent recording interval and the recording capacity of the recording medium which lave been given from the outside, and the video signals are intermittently recorded on the recording medium according to the optimum intermittent recording interval which has been calculated. Or, alternatively, optimum intermittent recording interval for the video signals to be recorded is calculated from the total recording time and the recording capacity of the recording medium, which have been given from the outside, and the video signals are intermittently recorded on the recording medium according to the optimum intermittent recording interval which has been calculated. These calculated data, recording capacity of the recording medium and other information are displayed on a display unit for easy recognition by the user.

The above and further objects and features of the invention will more fully be apparent from the following detailed description with accompanying drawings.

DESCRIPTION OF THE PREFERRED EMBODIMENTS (First Embodiment)

Figure 1:
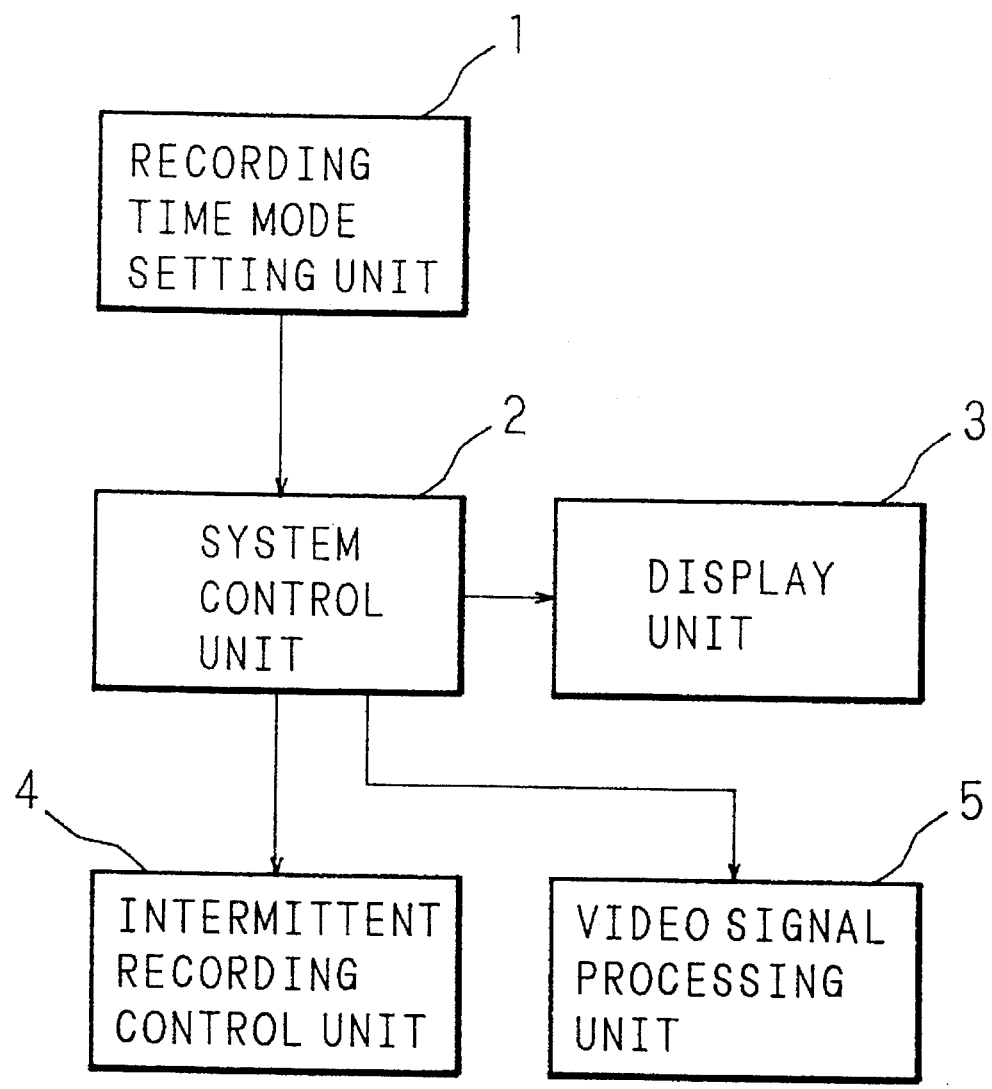
FIG. 1 is a block circuit diagram illustrative of the constitution of a conventional intermittent recording apparatus.
Figure 2:
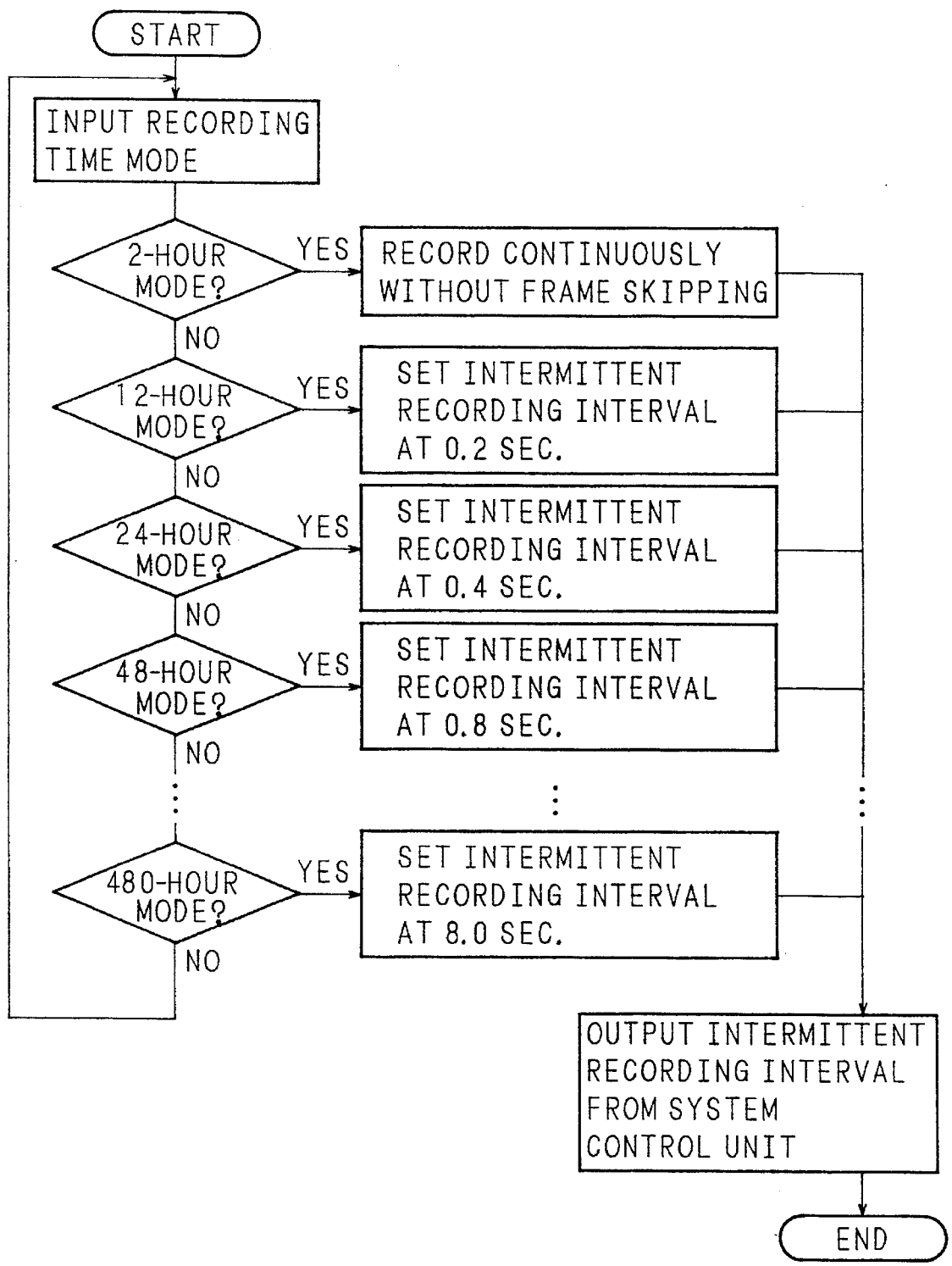
FIG. 2 is a flow chart illustrative of the conventional intermittent recording interval setting method.
Figure 3:
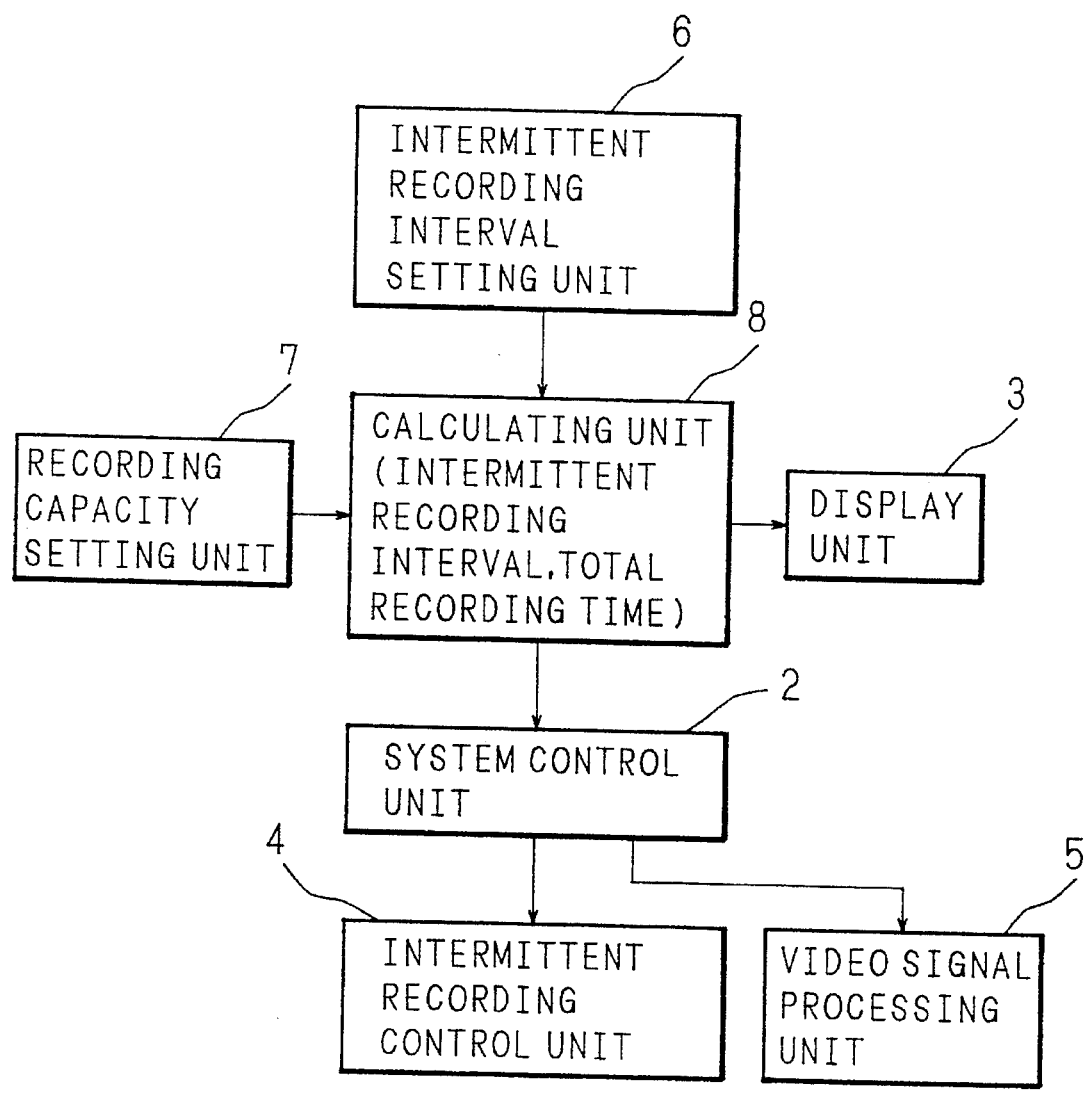
FIG. 3 is a block circuit diagram illustrative of the constitution of an intermittent recording apparatus of the invention.
Figure 4:
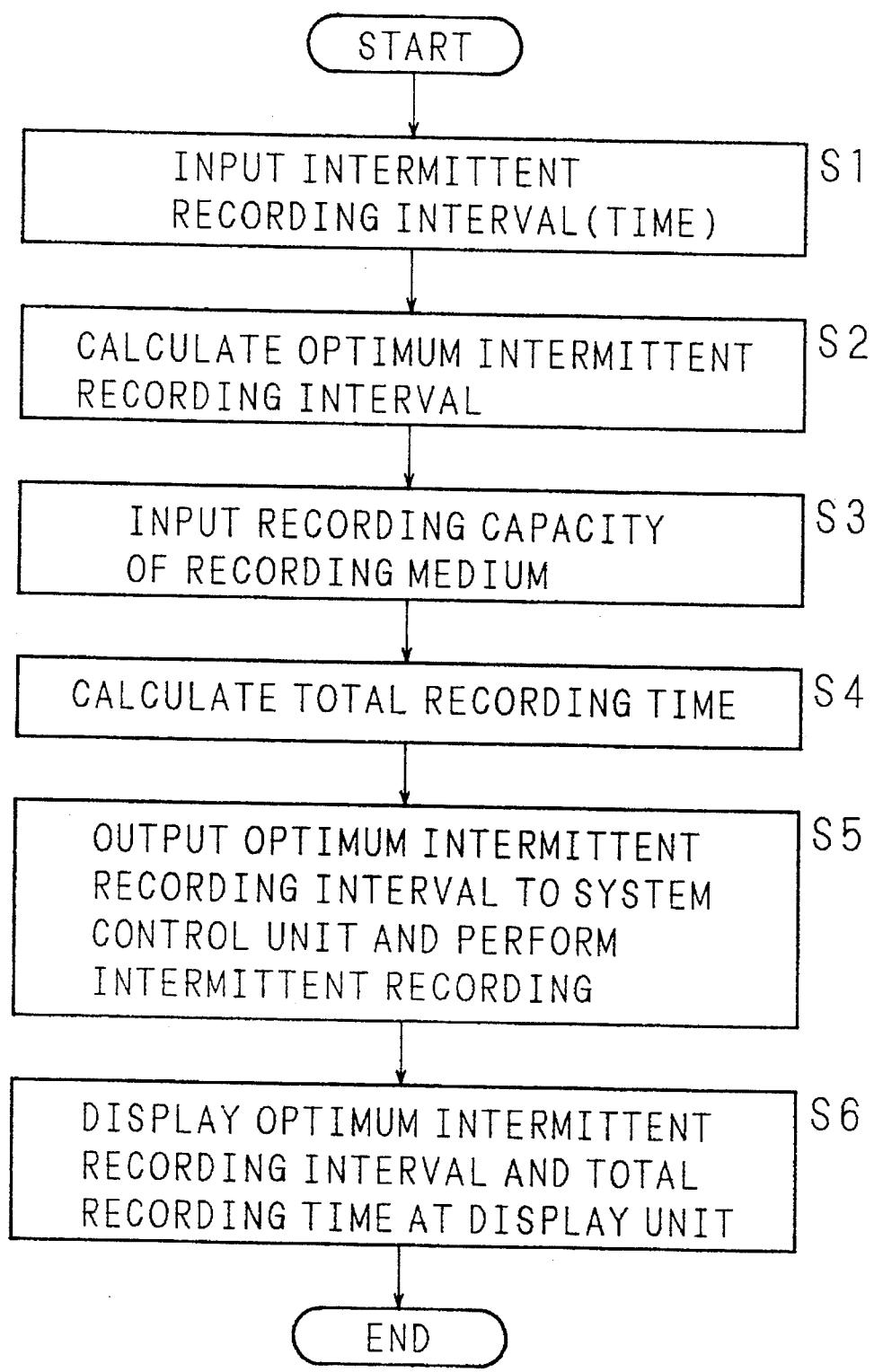
FIG. 4 is a flow chart illustrative of the operating procedure of the intermittent recording apparatus of the invention.

The first embodiment of the invention will be described below with reference to FIG. 3 and FIG. 4. In FIG. 3, numerals identical with those in FIG. 1 represent identical components, and therefore description thereof will be omitted. Numeral 6 denotes an intermittent recording interval setting unit to input the intermittent recording interval from the outside and set it. Numeral 7 denotes a recording capacity setting unit to input the recording capacity of the recording medium to be used in recording from the outside and set it. Numeral 8 denotes a calculating unit to calculate the optimum intermittent recording interval and total recording time according to the intermittent recording interval and the recording capacity which are set in the intermittent recording interval setting unit 6 and the recording capacity setting unit 7.

The operation will now be described below. When time data of the intermittent recording interval is input (step S1) from the intermittent recording interval setting unit 6, optimum recording interval is calculated in the calculating unit 8 (step S2). Optimization at this time is carried out in such a procedure as; because the period of intermittent recording interval is the product of the frame period or the field period of the video signal and an integer, the time data of the intermittent recording interval which has been input is adjusted to the value multiplied by the integer. For example, the optimization can be done by the following equation.

$$T_W = INT\{T_{IN}/(T_{FR} \text{ or } T_{FI})\} \times (T_{FR} \text{ or } T_{FI})$$

where $T_W$: Calculated optimum intermittent recording interval (second)

$T_{IN}$: Input intermittent recording interval (second)

$T_{FR}$: Frame period of video signals (second)

$T_{FI}$: Field period of video signals (second)

Then when data of the recording capacity of the recording medium is input from the recording capacity setting unit 7 (step S3), the calculating unit 8 calculates the total recording time from this data and the optimum intermittent recording interval (step S4). When the optimum intermittent recording interval is 0.6 seconds per frame and a magnetic tape having a recording capacity of 120 minutes is used, for example, total recording time becomes 120 (minutes)×{0.6 (seconds)/ (1/30) (seconds)}=2160 (minutes)=36 (hours).

The calculated intermittent recording interval is then sent to the system control unit 2, so that the system control unit 2 controls the intermittent recording control unit 4 and the video signal processing unit 5 according to this input data, thereby to carry out the intermittent recording (step S5). The optimum intermittent recording interval and the total recording time which have been calculated are sent to the display unit 3 and are displayed (step S6).

The first embodiment has an advantage of easy operation, because the optimum intermittent recording interval and the total recording time are calculated from the input intermittent recording interval and are displayed. Even when an incomplete intermittent recording interval is set, intermittent recording can be carried out properly by calculating an intermittent recording interval conforming to the format of the video signals to be recorded.

Although a constant intermittent recording interval is set in the first embodiment, the intervals may not be constant if they are set in the unit of frame or field of the video signals. Although the intermittent recording interval and the total recording time, which are calculated, are displayed on the display unit 3 in the first embodiment, display of the recording capacity of the recording medium may be added to this. Moreover, the optimum intermittent recording interval is set smaller than the input intermittent recording interval in the first embodiment, though the optimum intermittent recording interval may be set greater than the input intermittent recording interval.

(Second Embodiment)

Figure 5:
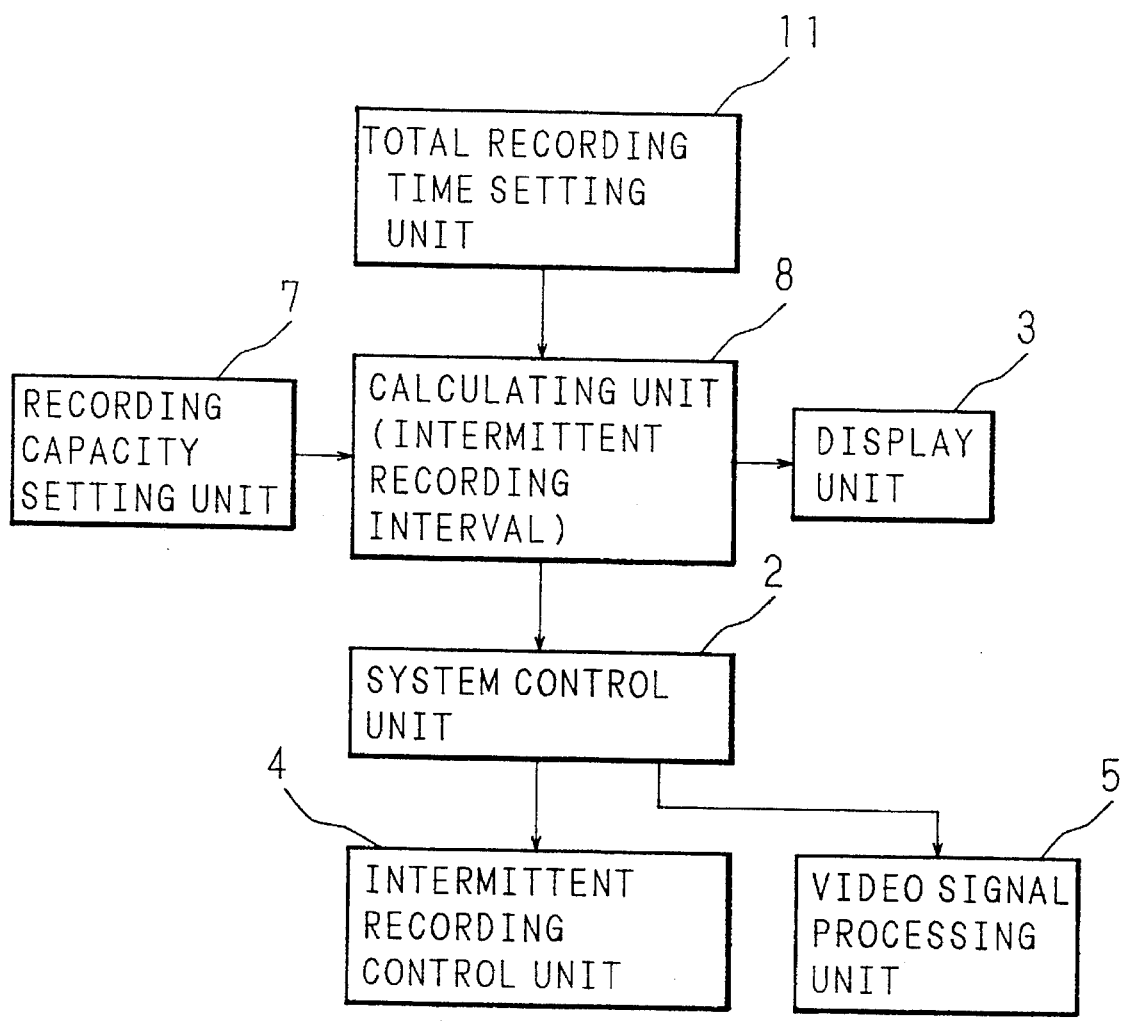
FIG. 5 is a block circuit diagram illustrative of the constitution of another intermittent recording apparatus of the invention.
Figure 6:
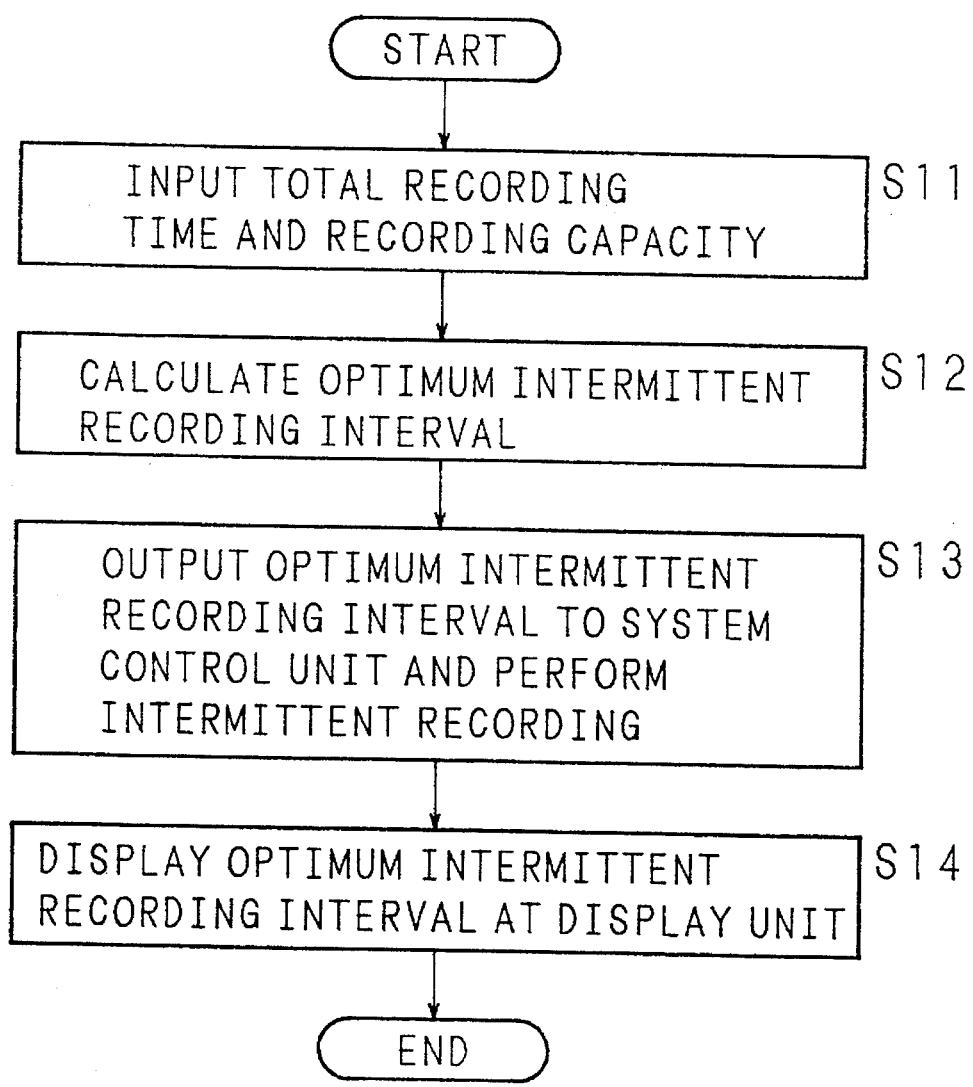
FIG. 6 is a flow chart illustrative of the operating procedure of another intermittent recording apparatus of the invention.

The second embodiment of the invention will now be described below with reference to FIG. 5 and FIG. 6. In FIG. 5, numerals identical with those in FIG. 3 represent identical components, and therefore description thereof will be omitted. In FIG. 5, numeral 11 denotes a total recording time setting unit used by the user to input and set the total recording time from the outside.

The operation will now be described below. When data of the total recording time is input from the total recording time setting unit 11 and data of the recording capacity of the recording medium is input from the recording capacity setting unit 7 (step S11), optimum intermittent recording interval is calculated based on these data in the calculating unit 8 (step S12).

Then the calculated intermittent recording interval is output to the system control unit 2. The system control unit 2 controls the intermittent recording control unit 4 and the video signal processing unit 5 according to this input data to carry out the intermittent recording (step S13). The optimum intermittent recording interval which has been calculated is sent to the display unit 3 where it is displayed (step S14). In addition to the calculated optimum intermittent recording interval, input total recording time, recording capacity of the recording medium and other information may also be displayed.

In the second embodiment, because the optimum intermittent recording interval is calculated from the input total recording time and recording capacity of the recording medium to be used, intermittent recording interval suitable for the purpose can be obtained automatically, making the operation easier.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An intermittent recording method to record video signals intermittently on a recording medium, comprising the steps of:

a) setting a desired arbitrary intermittent recording interval $T_{IN}$;

b) calculating an optimum intermittent recording interval $T_W$ conforming to a video signal format, from said desired arbitrary intermittent recording interval $T_{IN}$ by the following equation:

$$T_W = INT\{T_{IN}/(T_{FR} \text{ or } T_{FI})\} \times (T_{FR} \text{ or } T_{FI})$$

where $T_{FR}$: Frame period of video signals $T_{FI}$: Field period of video signals c) setting a recording capacity of said recording medium;

d) calculating a total recording time from said optimum intermittent recording interval $T_W$ and said recording capacity;

e) recording said video signals on said recording medium intermittently at said optimum intermittent recording interval $T_W$; and f) displaying said optimum intermittent recording interval $T_W$ and said total recording time.

2. An intermittent recording method to record video signals intermittently on a recording medium, comprising the steps of:

a) setting a desired arbitrary total recording time;

b) setting a recording capacity of said recording medium;

c) calculating an optimum intermittent recording interval for recording of said video signals to be recorded from said desired arbitrary total recording time and said recording capacity;

d) recording said video signals on said recording medium intermittently at said optimum intermittent recording interval; and e) displaying said optimum intermittent recording interval.

3. An intermittent recording apparatus for video signals, comprising:

means for inputting a desired arbitrary intermittent recording interval $T_{IN}$;

means for calculating an intermittent recording interval $T_W$ conforming to a video signal format, from said input desired arbitrary intermittent recording interval $T_{IN}$ by the following equation:

$$T_W = INT\{T_{IN}/(T_{FR} \text{ or } T_{FI})\} \times (T_{FR} \text{ or } T_{FI})$$

where $T_{FR}$: Frame period of video signals $T_{FI}$: Field period of video signals;

means for inputting a recording capacity of a recording medium;

means for calculating a total recording time from said intermittent recording interval $T_W$ and said inputted recording capacity of said recording medium;

means for recording said video signals on a recording medium intermittently according to said intermittent recording interval $T_W$; and means for displaying said intermittent recording interval $T_W$ and said calculated total recording time.

4. An intermittent recording apparatus for recording video signals intermittently on a recording medium, comprising:

means for inputting a recording capacity of said recording medium;

means for inputting a desired arbitrary total recording time;

calculation means for calculating an optimum intermittent recording interval for said video signals, from said input recording capacity of said recording medium and said input desired total recording time;

display means for displaying said optimum intermittent recording interval;

intermittent recording control means for controlling an operation of an intermittent recording;

video signal processing means for processing video signals to be recorded intermittently; and control means for controlling said intermittent recording control means and said video signal processing means according to said optimum intermittent recording interval.

* * * * *